(12) United States Patent
Merkel et al.

(10) Patent No.: US 10,090,703 B2
(45) Date of Patent: Oct. 2, 2018

(54) CONVERTER MODULE AND SWITCHGEAR ASSEMBLY FOR AC AND DC POWER DISTRIBUTION

(71) Applicant: ABB AG, Mannheim (DE)

(72) Inventors: Hans-Peter Merkel, Schriesheim (DE); Matthias Forstbach, Einhause (DE); Andre Schaerer, Moeriken (CH)

(73) Assignee: ABB AG, Mannheim (DE)

( * ) Notice: Subject to any disclaimer, the term of this patent is extended or adjusted under 35 U.S.C. 154(b) by 50 days.

(21) Appl. No.: 15/106,331

(22) PCT Filed: Dec. 10, 2014

(86) PCT No.: PCT/EP2014/077210
§ 371 (c)(1),
(2) Date: Jun. 20, 2016

(87) PCT Pub. No.: WO2015/091154
PCT Pub. Date: Jun. 25, 2015

(65) Prior Publication Data
US 2017/0005514 A1    Jan. 5, 2017

(30) Foreign Application Priority Data
Dec. 20, 2013    (EP) .................................. 13005972

(51) Int. Cl.
*H02J 1/10*    (2006.01)
*H02J 3/38*    (2006.01)
(Continued)

(52) U.S. Cl.
CPC .............. *H02J 9/062* (2013.01); *H02J 1/102* (2013.01); *H02J 4/00* (2013.01); *H02M 7/493* (2013.01)

(58) Field of Classification Search
CPC .. H02J 9/062; H02J 4/00; H02J 1/102; H02M 7/493
(Continued)

(56) References Cited

U.S. PATENT DOCUMENTS 9,419,475 B2 *   8/2016  Edelen ................... H02J 9/062
2005/0162792 A1*  7/2005  Wang ......................... H02J 3/46
                                                                361/62
(Continued)

FOREIGN PATENT DOCUMENTS

EP          1355404 A1    10/2003

OTHER PUBLICATIONS

ABB: "MNS Low Voltage Switchgear System Guide", Dec. 31, 2012 (Dec. 31, 2012), XP055117179, Retrieved from the Internet: URL: http://www05.abb.com/global/scot/scot209.nsf/veritydisplay/a4d3ca5ddcf0c4dbc1257a9800150f36/$file/MNS_System_Guide_1TGC902030B0204_Rev04%20print.pdf [retrieved on May 9, 2014], pp. 5-7, pp. 17-19.
(Continued)

*Primary Examiner* — Carlos Amaya
(74) *Attorney, Agent, or Firm* — Leydig, Voit & Mayer, Ltd.

(57) ABSTRACT

A converter module for use in a switchgear assembly for power distribution, has: one or more AC supply bus bars for providing AC power supply; one or more AC or DC power distribution bus bars for distributing power to loads; and one or more converter units for converting AC power from the AC supply bus bars to AC or DC power onto AC or DC power distribution bus bars, respectively.

11 Claims, 5 Drawing Sheets

(51) Int. Cl.
*H02J 9/00* (2006.01)
*H02J 9/06* (2006.01)
*H02M 7/493* (2007.01)
*H02J 4/00* (2006.01)

(58) Field of Classification Search
USPC .......................................................... 307/23
See application file for complete search history.

(56) References Cited

U.S. PATENT DOCUMENTS

| | | | |
|---|---|---|---|
| 2010/0102636 A1 | 4/2010 | Tracy et al. | |
| 2011/0006607 A1* | 1/2011 | Kwon | G06F 1/30 307/66 |
| 2014/0077607 A1* | 3/2014 | Clarke | H02J 3/005 307/75 |

OTHER PUBLICATIONS

De Jong & P T M Vaessen E C W: "DC power distribution for server farms", Internet Citation, Sep. 2007 (Sep. 2007), 1-14, XP002716084, Retrieved from the Internet: URL: http://leonardo-energy,.dev.o-a.be/sites/leonardo-energy/files/root/pdf/2007/DCServerFarms.pdf [retrieved on Nov. 7, 2013] figures 2-4.

* cited by examiner

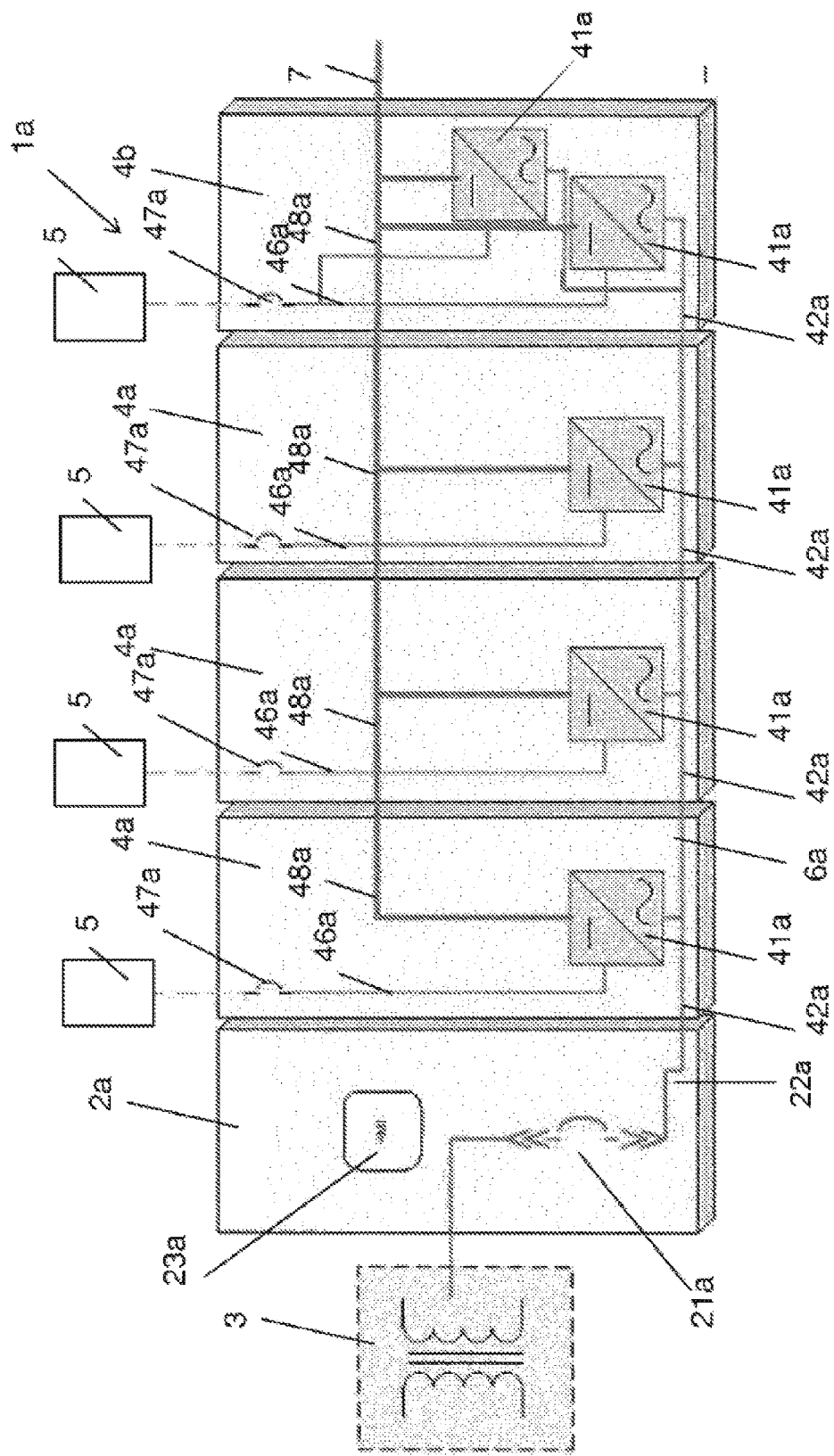

- Option 1
  - 3-level AFE (active front end)
  - 3-level buck (step-down converter)

CONVERTER MODULE AND SWITCHGEAR ASSEMBLY FOR AC AND DC POWER DISTRIBUTION

CROSS-REFERENCE TO RELATED APPLICATIONS

This application is a U.S. national stage application under 35 U.S.C. § 371 of International Application No. PCT/EP2014/077210, filed on Dec. 10, 2014, and claims benefit to European Patent Application No. 13 005 972.8, filed on Dec. 20, 2013. The International Application was published in English on Jun. 25, 2015, as WO 2015/091154 A1 under PCT Article 21(2).

FIELD

The present invention relates to a converter module for use in a modularized switchgear assembly for power distribution systems for supplying AC and/or DC power to a consumer load, in particular to a data center.

BACKGROUND

Common electrical switchgear assemblies are predominantly designed using so-called withdrawable part technology and/or modularized devices, wherein the operating means and devices for processing, control, measuring and switching are arranged on or in withdrawable parts and/or exchangeable modules or cabinets.

The withdrawable part technology provides a simplified access in case of fault or maintenance activities because the parts in question can easily be removed from the housing and therefore checked, repaired, exchanged or replaced without any considerable dismantling work.

Today's data center setups use stand-alone AC/DC and AC/AC converter units with uninterruptible power supplies to secure the energy supply of the data center. This configuration requires independent components to transfer the power from the medium-voltage level to a reliable uninterruptible supply on the low-voltage side for the server racks in the data center.

Common switchgear assemblies for data centers use separate stand-alone uninterruptable power supply (UPS) modules to ensure and secure a permanent energy supply to the consumers of the data center or any other connected consumer loads. In conventional assemblies, the configuration of the converter units hence needs to be dimensioned separately from the auxiliary power supply provided by the stand-alone UPS modules.

A disadvantage of such an assembly with stand-alone UPS modules is the additional effort required for engineering, commissioning and maintenance as well as costs and energy of thermal losses induced by cabling and the provision of additional breakers.

SUMMARY

An aspect of the invention provides a converter module for use in a switchgear assembly for power distribution, the module comprising: an AC supply bus bar configured to provide AC power supply; an AC or DC power distribution bus bar configured to distribute power to loads; and a converter unit configured to convert AC power from the AC supply bus bar to AC or DC power onto AC or DC power distribution bus bar, respectively.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1a shows an exemplary switchgear assembly for DC power distribution using converter modules, with at least one converter module having more than one converter unit according to the invention;

DETAILED DESCRIPTION

Figure 1:
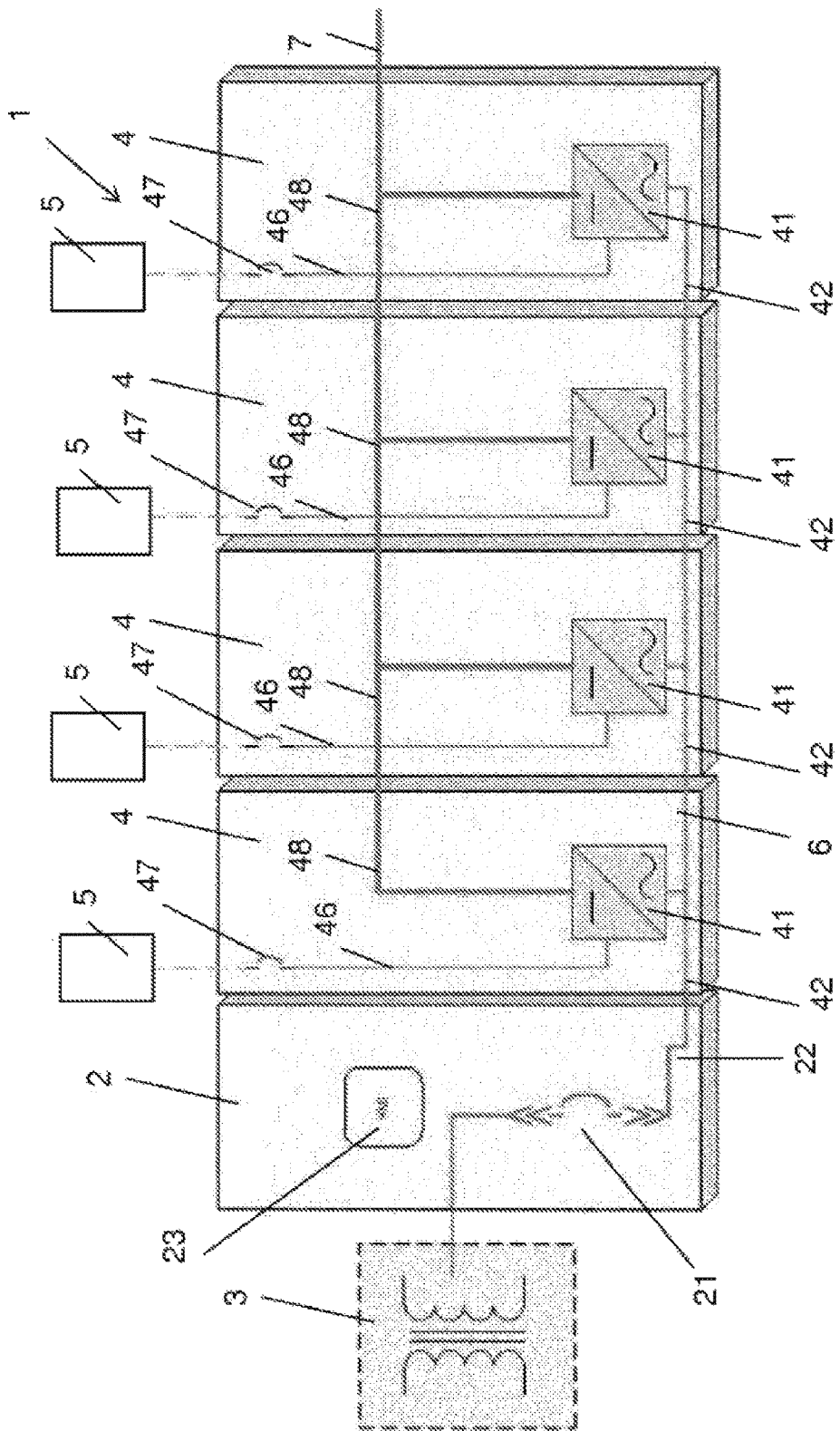
FIG. 1 shows an exemplary switchgear assembly for DC power distribution using converter modules according to the invention.

An aspect of the present invention provides a converter module and switchgear assembly with one or more converters having a power distribution system for providing AC and/or DC power, e. g. for a data center, which further provide an uninterruptable power supply for the AC and/or DC power and which can easily be customized according to the specific power requirements of the data center.

An aspect of the invention provides a converter module for use in a switchgear assembly, in particular a low voltage switchgear assembly, to provide AC and/or DC power according to claim 1 and by the switchgear assembly for power distribution and the power distribution system according to the further independent claims.

Further embodiments and refinements are indicated in the dependent subclaims and the following description.

According to a first aspect, a converter module for use in a switchgear assembly, in particular a low voltage switchgear assembly, for power distribution is provided, comprising:
one or more AC supply bus bars for providing AC power supply;
one or more AC or DC power distribution bus bars for distributing power to loads; and
one or more converter units for converting AC power from the AC supply bus bars to AC or DC power onto AC or DC power distribution bus bars, respectively.

The above converter module for use in a switchgear assembly allows for a higher flexibility and reliability with lower investment and operational costs on a higher level of maintainability.

Furthermore, the AC supply bus bars are configured to form an AC supply bus with AC supply bus bars of one or more other coupled modules.

Moreover, the converter unit is configured to convert AC power to AC power onto the AC power distribution bus bars, wherein the AC power distribution bus bars are configured to form the AC power distribution bus with coupled AC supply bus bars of one or more other coupled modules.

According to an embodiment, the converter unit may be configured to convert AC power to DC power onto the DC power distribution bus bars, wherein the DC power distribution bus bars are configured to form the DC power distribution bus with coupled DC supply bus bars of one or more other coupled modules.

It may be provided that the converter unit comprises an active front end and a buck converter which are coupled through a DC link, wherein a battery unit of a UPS, which is provided internally or externally of a cabinet of the converter module, is coupled via the DC link.

The converter module may form a separate cabinet or cubicle.

According to a further aspect, a switchgear assembly is provided, comprising:
- a main breaker module including a general circuit breaker for switching an AC supply bus; and
- at least one of
  - one or more AC/DC converter modules for converting AC power from the AC supply bus to DC power onto a DC power distribution bus; and
  - one or more AC/AC converter modules for converting AC power from the AC supply bus to AC power onto an AC power distribution bus, Moreover, the converter modules may be coupled in parallel with their AC supply bus bars.

Particularly, the converter modules may be coupled in parallel to their AC or DC power distribution bus bars.

It may be provided that the converter modules are coupled to the AC power supply via respective first circuit breaker modules and/or to the respective power distribution bus via second circuit breaker modules.

According to a further aspect, a power distribution system for a switchgear assembly, in particular a low voltage switchgear assembly, is provided, including:
- an AC supply bus for providing an AC power supply;
- a DC power distribution bus for providing DC power and/or an AC power distribution bus for providing AC power;
- general circuit breaker for switching the AC supply bus;
- one or more AC/DC converter units for converting AC power from the AC supply bus to DC power onto the DC power distribution bus; and/or
- one or more AC/AC converter units for converting AC power from the AC supply bus to AC power onto the AC power distribution bus.

FIG. 1 shows a switchgear assembly 1, e. g. as used for DC power distribution in a data center. The switchgear assembly 1 comprises a number of modules or cabinets which are arranged side by side and electrically interconnected.

The switchgear assembly 1 has a main breaker module 2 or a main breaker cabinet including a main breaker 21 which is connected to an AC power supply of a common grid or a transformer for galvanic insulation or the like. The main breaker module 2 is a separate module/cabinet having multiple AC supply bus bars 22, one per each phase. The multiple AC supply bus bars 22 are part of a single AC supply bus 6 formed with AC supply bus bars of other coupled modules and configured to be easily coupled or connected with the AC supply bus bars of the other coupled modules.

Furthermore, an HMI (Human Machine Interface) 23 is provided to display system status information.

In the present embodiment, the main breaker module 2 is coupled to a number of AC/DC converter modules 4 (four in the present embodiment). Each of the AC/DC converter modules 4 includes an AC/DC converter unit 41. AC power is supplied to each of the AC/DC converter units 41 via the AC supply bus bars 42 of the AC/DC converter module 4 which is configured to be coupleable to AC supply bus bars of other modules, e. g. to be coupled to one another and to the AC power distribution bus 22 of the main breaker module 2, to form the AC supply bus 6. Hence, a line-up of a number of AC/DC converter modules 4 can be built.

FIG. 1a shows a switchgear assembly 1a, e.g. as used for DC power distribution in a data center. The switchgear assembly 1a comprises a number of modules or cabinets which are arranged side by side and electrically interconnected.

The switchgear assembly 1a has a main breaker module 2a or a main breaker cabinet including a main breaker 21a which is connected to an AC power supply of a common grid or a transformer for galvanic insulation or the like. The main breaker module 2a is a separate module/cabinet having multiple AC supply bus bars 22a, one per each phase. The multiple AC supply bus bars 22a are part of a single AC supply bus 6a formed with AC supply bus bars of other coupled modules and configured to be easily coupled or connected with the AC supply bus bars of the other coupled modules.

Furthermore, an HMI (Human Machine Interface) 23a is provided to display system status information.

In the present embodiment, the main breaker module 2a is coupled to a number of AC/DC converter modules 4a, 4b. Three of the AC/DC converter modules 4a each includes an AC/DC converter units 41a, wherein at least one converter module 4b includes an AC/DC two or more converter units 41a. AC power is supplied to each of the AC/DC converter units 41a via the AC supply bus bars 42a of the AC/DC converter module 4a which is configured to be coupleable to AC supply bus bars of other modules, e. g. to be coupled to one another and to the AC power distribution bus 22a of the main breaker module 2a, to form the AC supply bus 6a. Hence, a line-up of a number of AC/DC converter modules 4a can be built.

Figure 2:
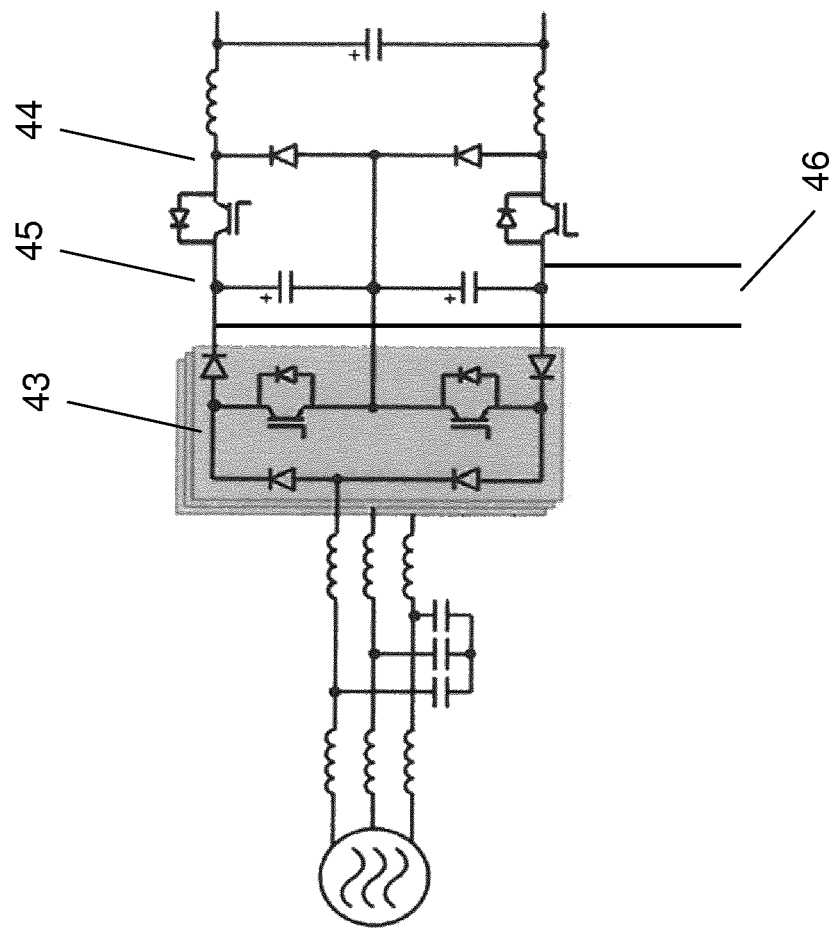
FIG. 2 shows an example of a DC converter unit based on an active front end and a buck converter according to the invention.

In FIG. 2, an example of an AC/DC converter unit 41 based on a 3-level active front-end converter 43 and a 3-level buck converter 44 is shown, wherein an output of the 3-level active front-end converter 43 and an input of the 3-level buck converter 44 are coupled via DC link capacitors 45. The DC link capacitors 45 can be connected to a DC source battery string 46, in particular for feeding on a 750 VDC internal DC level.

Via the DC source battery string 46 of each AC/DC converter module 4, a separated battery module (or cabinet or cubicle) 5 can be coupled to each of the AC/DC converter modules 4. The DC source battery string 46 of each AC/DC converter module 4 can be provided with an additional DC circuit breaker 47 to protect the battery module 5 and/or the AC/DC converter unit 41.

The AC/DC converter modules 4 may be provided with the battery modules 5 which can be included in the AC/DC converter module 4. Alternatively, the battery modules 5 can be arranged separately and electrically connected to the DC source battery string 46 of the AC/DC converter module 4.

The DC output of the AC/DC converter unit 41 is coupled to DC power distribution bus bars 48. The DC power distribution bus bars 48 of the AC/DC converter modules 4 are coupled or configured to be coupled to each other to form a common DC power distribution bus 7 which passes through the AC/DC converter modules 4. Therefore any number of AC/DC converter modules 4 can be coupled to provide a DC distribution bus 7 passing through all of the coupled AC/DC converter modules 4.

The DC power distribution bus bars 48 of the DC power distribution system will provide a floating ground system which allows highest reliability as not even the first ground fault will cause a system shutdown. In combination with the floating ground system, an earth fault supervision system may be provided in each of the AC/DC converter units 41 to indicate the ground fault and to allow the operator to identify the fault area and to repair it even online.

The above AC/DC converter modules 4 for use in the switchgear assembly 1 allow for a higher flexibility and reliability with lower investment and operational costs on a higher level of maintainability.

Figure 3:
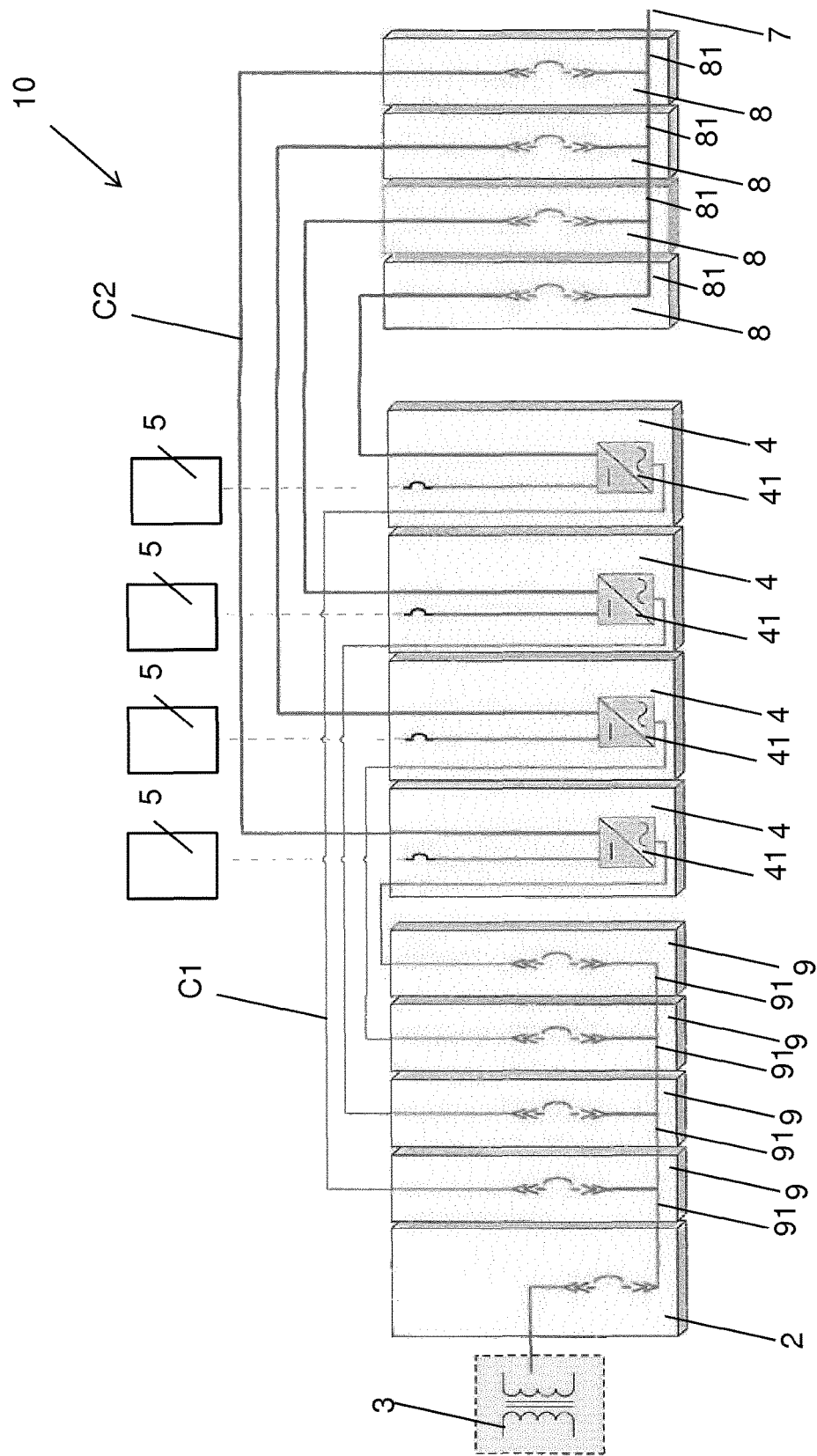
FIG. 3 shows a further embodiment of a switchgear assembly for DC power distribution using converter modules according to the invention.

In FIG. 3, a different configuration of the switchgear assembly 10 is shown. In contrast to the switchgear assembly 1 as shown in FIG. 1, the AC/DC converter modules 4 are connected to the AC source 3 separately via respective first circuit breaker modules 9 coupled between the main breaker module 2 and the respective AC/DC converter module 4. Each of the first circuit breaker modules 9 has AC main supply bus bars 91 coupled to one another and to the main breaker module 2. Moreover, each first circuit breaker module 9 includes a respective circuit breaker 92 a first terminal of which is coupled to the respective AC main supply bus bar 91 and a second terminal of which is coupled via a respective first connection C1 to the corresponding AC/DC converter modules 4.

The DC power distribution bus bars 48 of the AC/DC converter modules 4 are coupled via separate second circuit breaker modules 8/a second circuit breaker cabinet, respectively, to the DC power distribution bus 7. Therefore, the outputs of the AC/DC units 41 are coupled via second connections C2 to the second circuit breaker modules 8. The DC power distribution bus 7 is formed by the DC power distribution bus bars 81 in the second circuit breaker modules 8 which are coupled to each other.

Figure 4:
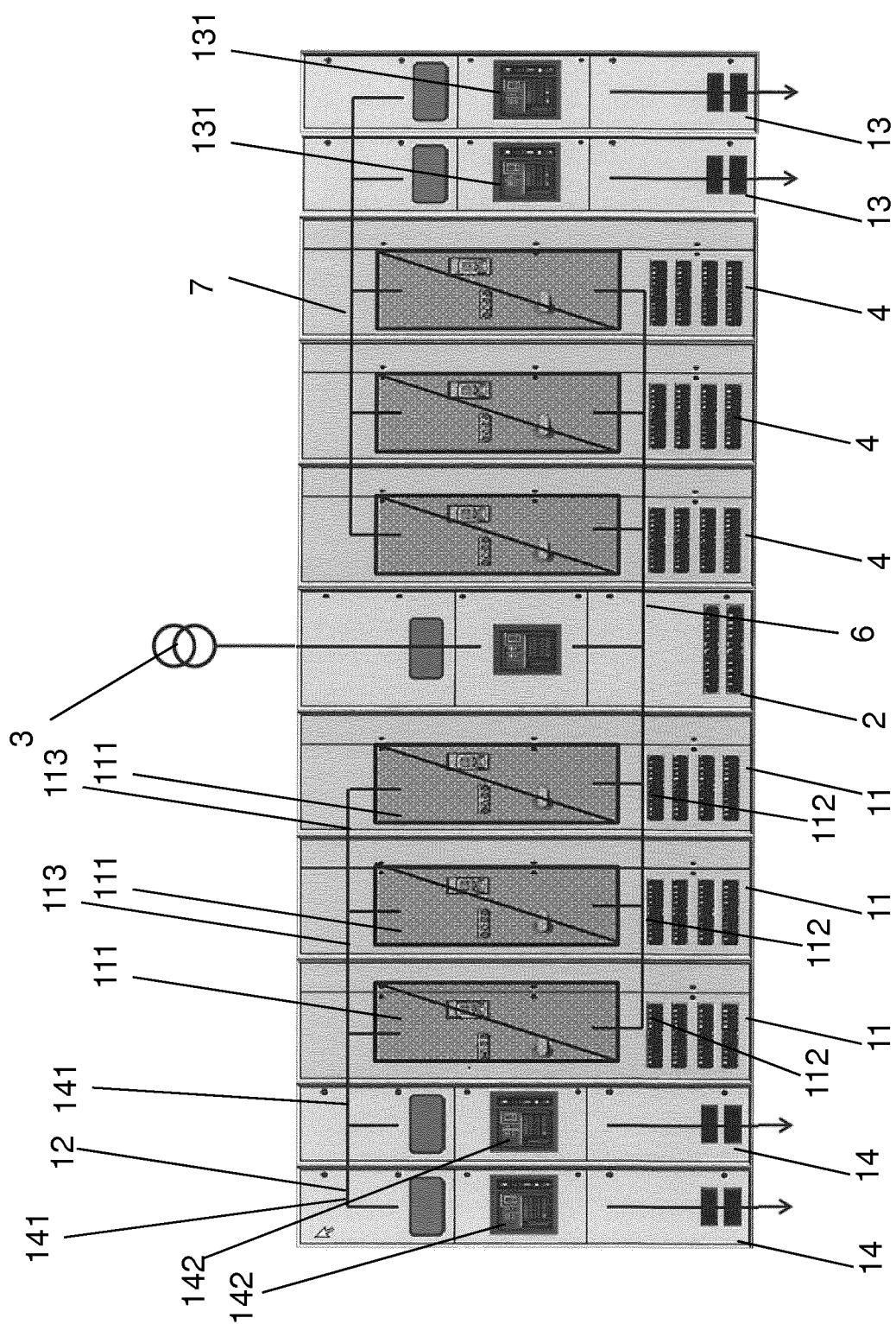
FIG. 4 shows a further embodiment of a switchgear assembly for AC and DC power distribution according to the invention.

As shown in the further embodiment of FIG. 4, in addition to the embodiment of FIG. 1, the main breaker module 2 can be further coupled to AC/AC converter modules 11. The AC/AC converter modules 11 can be provided in any number (three in the present embodiment) depending on the requirements of the consumer loads in the data center. The AC/AC converter modules 11 comprise AC/AC converter units 111 which receive AC power supply via the AC supply bus bars 112 of the AC/AC converter module 11. The AC supply bus bars 112 together with the AC supply bus bars 22 of the main breaker module 2 and the AC supply bus bars 42 of the AC/DC converter modules 4 form the common AC supply bus 6.

The AC/AC converter units 111 receive AC supply power from the thus formed AC supply bus 6 and output converted AC power on AC power distribution bus bars 113. The AC power distribution bus bars 113 are coupled to each other to form an AC power distribution bus 12.

The AC supply bus bars 112 are coupled to the AC supply bus bars 22 of the main breaker module 2, so that the AC supply power is distributed over all AC/AC converter modules 11. Furthermore, the AC power distribution bus 12 comprises AC power distribution bus bars 113 which pass through all of the AC/AC converter modules 11.

The AC/DC converter modules 4 can be coupled via the DC power distribution bus 7 to DC feeder modules 13 which are configured to couple the DC power distribution bus 7 to respective consumer loads (not shown). The DC feeder modules 13 may comprise respective breakers 131 for switching consumer loads supplied with DC power. Similarly, AC feeder modules 14 are provided which comprise AC power distribution bus bars 141 to be coupled to the AC power distribution bus bars 113 of the AC/AC converter modules 11, so that the AC power output by the AC/AC converter units 111 can be fed via respective breakers 142 to consumer loads powered with AC current.

The above configuration provides an increased reliability as the converter units, i.e. the AC/DC converter units 41 and the AC/AC converter units 111, are coupled in parallel, so that even if one complete rectifier string fails or is shut down for maintenance the system will remain in operation as long as the required total power does not exceed the power capacity of the converter units 41, 111 that remain active.

Next to the main line-up with the main breaker module 2 and the AC/DC converter module 4, the system allows the standard extension possibilities of a switchgear assembly. Hence, it is possible to connect the main distribution and subdistribution on the DC part directly to the main bus bar system as well as to connect AC parts like AC distribution for lightning or air conditioning or an additional incoming section for the generator.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A switchgear assembly, comprising:
   a main breaker module including a general circuit breaker configured to switch an AC supply bus connected to an AC source;
   at least two AC/DC converter modules configured to convert AC power from the AC supply bus to DC power onto a DC power distribution bus;
   at least two AC/AC converter modules configured to convert AC power from the AC supply bus to AC power onto an AC power distribution bus,
   wherein each AC/DC converter module and each AC/AC converter module includes its own AC supply bus bar, wherein the at least two AC/DC converter modules and the at least two AC/AC converter modules are coupled in parallel with respect to their AC supply bus bars.

2. The assembly of claim 1, wherein the AC supply bus comprises the AC supply bus bars of the at least two AC/DC converter modules and the at least two AC/AC converter modules.

3. The assembly of claim 1,
wherein each AC/AC converter module includes its own AC power distribution bus bar, and
wherein the AC power distribution bus comprises the AC power distribution bus bars of the at least two AC/AC converter modules.

4. The assembly of claim 1, wherein each AC/DC converter module includes its own DC power distribution bus bar, and
wherein the DC power distribution bus comprises the DC power distribution bus bars of the at least two AC/DC converter modules.

5. The assembly of claim 4, wherein at least one of the at least two AC/DC converter modules includes an active front-end converter and a buck converter which are coupled through a DC link, and
wherein a UPS battery unit, which is provided internally or externally to a cabinet of the converter module, is coupled via the DC link.

6. The assembly of claim 1, wherein each of the at least two AC/DC converter modules and the at least two AC/AC converter modules forms a separate cabinet or cubicle.

7. The assembly of claim 1, wherein the at least two AC/DC converter modules are coupled in parallel with respect to the DC power distribution bus and the at least two AC/AC converter modules are coupled in parallel with respect to the AC power distribution bus.

8. The assembly of claim 1, wherein the at least two AC/DC converter modules are coupled with the AC source via respective first circuit breaker modules and/or with the DC power distribution bus via second circuit breaker modules.

9. The assembly of claim 1, wherein each of the at least two AC/AC converter modules includes its own AC power distribution bus bar.

10. The assembly of claim 1, wherein each of the at least two AC/DC converter modules includes its own DC power distribution bus bar.

11. A power distribution system for a switchgear assembly, the system comprising:
an AC supply bus configured to provide an AC power supply;
a general circuit breaker configured to switch the AC supply bus;
a DC power distribution bus configured to provide DC power;
an AC power distribution bus configured to provide AC power;
at least two AC/DC converter modules configured to convert AC power from the AC supply bus to DC power onto the DC power distribution bus, and
at least two AC/AC converter modules configured to convert AC power from the AC supply bus to AC power onto the AC power distribution bus,
wherein each AC/DC converter module and each AC/AC converter module includes its own AC supply bus bar,
wherein the at least two AC/DC converter modules and the at least two AC/AC converter modules are coupled in parallel with respect to their AC supply bus bars.

* * * * *